UNITED STATES PATENT OFFICE.

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN.

METHOD OF MANUFACTURING ARSENATE OF LEAD.

1,100,686.     Specification of Letters Patent.     Patented June 16, 1914.

No Drawing.     Application filed June 10, 1911. Serial No. 632,444.

*To all whom it may concern:*

Be it known that I, EDWIN O. BARSTOW, a citizen of the United States, and a resident of Midland, county of Midland, and State of Michigan, have invented a new and useful Improvement in Methods of Manufacturing Arsenate of Lead, of which the following is a specification, the principle of the invention being herein explained and the best mode in which I have contemplated applying that principle, so as to distinguish it from other inventions.

The present method, or process, may be regarded as a modification or specific aspect of the general process of manufacturing lead arsenate presented in my co-pending application filed June 10, 1911, Serial No. 632441. In this case, as in such general process, the mode of procedure involved is equally applicable to the manufacture of other insoluble metallic arsenates than such lead arsenate, as for example, zinc, iron, and barium arsenates. The process constituting the present invention, then, consists of the steps hereinafter fully described and particularly pointed out in the claims.

The following description sets forth in detail an approved mode of carrying out the invention, such disclosed mode, however, being merely illustrative of the various ways in which the principle of the invention may be used.

In the present improved method or process of obtaining lead arsenate, the initial step consists in adding hydrochloric acid to a solution of soluble arsenate, as, for example, to a solution of sodium arsenate ($Na_2HAsO_4$). Instead of hydrochloric acid, of course, any acid that, combined with the metal in the arsenate, forms a compound more soluble than the arsenate of such metal, may be employed. Hydrochloric acid, however, for various reasons is preferable among the halogen or other acids available, when lead arsenate is being made. The result of such treatment of the sodium arsenate solution with hydrochloric acid is the formation of a complex solution containing sodium arsenate, free arsenic acid, sodium chlorid, and free hydrochloric acid. The following reaction expresses this result, so far as the formation of the arsenic acid and sodium chlorid is concerned:

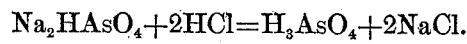

The remaining step, referring for the sake of illustration to the case where it is lead arsenate that is wanted, is carried out by adding to the solution resulting from the aforesaid reaction, an oxid, hydrate, carbonate, or basic carbonate of lead, which results in the formation of the end products, namely lead arsenate and sodium chlorid.

Either or both of the following reactions may be used to explain the production of the compounds just named:

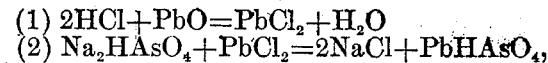

or thus:—

The foregoing operations, involving the addition of the hydrochloric acid to the arsenate and of the lead oxid, or equivalent oxygen derivative of lead, to the resulting solution are satisfactorily conducted in a wooden tank provided with a suitable stirrer. Furthermore the second of said operations is conducted with the solution so concentrated that the resulting mass will have the consistency of a cream or paste. It has been discovered that, by sufficiently prolonging the stirring, the lead arsenate may be made from the solid lead oxid, hydrate, carbonate, or basic carbonate, despite the fact that at first it would seem that this reaction could not be carried to completion because the resulting product, being solid, all of the lead oxid would not be reacted upon but particles of it would be inclosed in an impervious coating of the lead arsenate. By subjecting the liquid, however, to prolonged stirring or agitation this tendency has been successfully overcome, as above indicated. The lead arsenate so obtained may be conveniently separated out by filtration, and should be washed to remove the soluble salts that are mixed with it.

In the preceding description the addition of the hydrochloric acid lead oxid have been referred to as separate operations, the acid being added first, then the oxid; as a matter of fact, they may be added simultaneously, or the order reversed, if for any reason found desirable. Preferably the amount of hydrochloric acid used should be slightly less than an equivalent to the base present in the sodium arsenate used; and the amount of lead oxid used should be slightly less than that required to react with all the free acid present. In case these compounds are used in the relative quantities just indicated, there will be left in the final filtrate some soluble arsenic, that is either arsenic acid or soluble arsenate. These may be recovered in any suitable fashion before discarding the filtrate.

The oxygen derivatives of lead, which are suitable for use as compounds of that metal for reacting with arsenic acid to form lead arsenate, have been already indicated. The term "oxygen derivative" is intended therefore to connote such equivalents of lead oxid, in addition to those which have been specifically named, as will form the arsenate under the conditions surrounding the reaction. By way of general comment it should further be noted that the acid lead arsenate $PbHAsO_4$, and normal arsenate $Pb_3(AsO_4)_2$, are both commonly known to the trade as arsenate of lead. The latter term is accordingly to be understood as used herein in this general sense, and not as referring specifically to either of the two arsenates named, except where the contrary is indicated. So too, a soluble alkaline earth arsenate may be used instead of the alkaline arsenate hereinbefore specified as the preferred soluble arsenate, as will be readily understood, and such equivalent is intended to be connoted by the term "alkaline" as herein employed. Similarly hydrochloric acid, it will be understood, is typical of any acid that, combined with the metal of which the arsenate is desired, forms a compound more soluble than such arsenate. Thus acetic acid in the case of the manufacture of lead arsenate may be used in place of the hydrochloric acid with satisfactory results.

It is proper to state by way of conclusion that the several equations which have been hereinbefore referred to as expressive of the different reactions involved, have been presented as illustrative merely of the principal phenomena. They do not, however, necessarily represent all of the reactions that occur, and should be understood to indicate how the desired end-product is derived, rather than the exact intermediate steps leading up thereto. From the standpoint of the manufacturer or practical chemist, indeed, it might be better to represent the whole series of detailed reactions pertaining to each particular step or sub-process described above, as a single comprehensive reaction, in which only the starting materials and observed end-products are given. Thus for example, the specific mode of operation herein claimed may be represented as follows:—

$$Na_2HAsO_4 + 2HCl + PbO = PbHAsO_4 + 2NaCl + H_2O.$$

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. The method of making a relatively insoluble metal arsenate, which consists in treating a soluble arsenate other than arsenic acid with an acid that, combined with said metal, forms a compound more soluble than the arsenate of said metal; and mixing the resulting solution with a suitable compound of said metal, whereby such relatively less soluble arsenate is formed.

2. The method of making a relatively insoluble metal arsenate, which consists in treating an alkaline arsenate with a halogen acid; and mixing the resulting solution with a suitable compound of said metal, whereby the arsenate of said metal is formed.

3. The method of making a relatively insoluble metal arsenate, which consists in treating an alkaline arsenate with a halogen acid; and mixing the resulting solution with an oxygen derivative of said metal, whereby the arsenate of said metal is formed.

4. The method of making a relatively insoluble metal arsenate, which consists in treating a solution of sodium arsenate with hydrochloric acid; and mixing the resulting solution with an oxid of said metal, whereby the arsenate of said metal is formed.

5. The method of making lead arsenate, which consists in treating a soluble salt of arsenic acid with an acid that, combined with lead, forms a compound more soluble than lead arsenate; and mixing the resulting solution with a suitable compound of lead, whereby such relatively less soluble arsenate is formed.

6. The method of making lead arsenate, which consists in treating an alkaline arsenate with a halogen acid; and mixing the resulting solution with a suitable compound of lead, whereby lead arsenate is formed.

7. The method of making lead arsenate, which consists in treating an alkaline arsenate with a halogen acid; and mixing the resulting solution with an oxygen derivative of lead.

8. The method of making lead arsenate, which consists in treating sodium arsenate with hydrochloric acid; and mixing the resulting solution with lead oxid.

9. The method of making lead arsenate, which consists in treating sodium arsenate with hydrochloric acid in amount not more than equivalent to the base of said arsenate; and mixing the resulting solution with lead oxid.

10. In a method of making the arsenate of a metal, the step which consists in treating a soluble salt of arsenic acid with an acid that, combined with said metal, forms a compound more soluble than its arsenate.

11. In a method of making the arsenate of a metal, the step which consists in treating sodium arsenate with hydrochloric acid not more than equivalent to the base in said arsenate.

12. In a method of making lead arsenate, the step which consists in treating a soluble salt of arsenic acid with an acid, that combined with lead, forms a compound more soluble than lead arsenate.

13. The method of making lead arsenate, which consists in treating sodium arsenate with hydrochloric acid in amount less than equivalent to the base in said arsenate; and mixing the resulting solution with lead oxid.

14. The method of making lead arsenate which consists in treating sodium arsenate with hydrochloric acid in amount less than equivalent to the base in said arsenate; and mixing the resulting solution with lead oxid, such oxid being insufficient in amount to combine with all the free acid present.

Signed by me this 6th day of June, 1911.

EDWIN O. BARSTOW.

Attested by—
G. LEE CAMP,
D. A. NEWLAND.